Nov. 6, 1928.  
W. W. WILLIAMS  
1,691,002  
SAFETY CONTROL MECHANISM FOR FUEL FEEDING DEVICES  
Original Filed Aug. 31, 1923  3 Sheets-Sheet 2
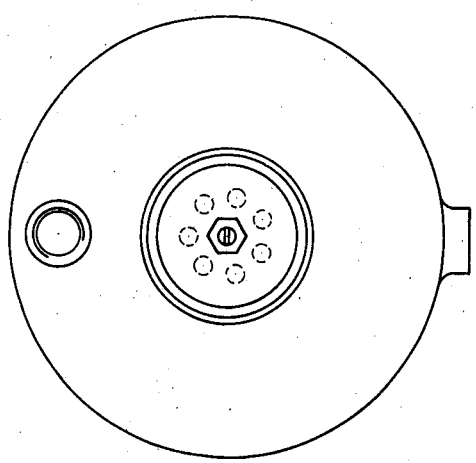
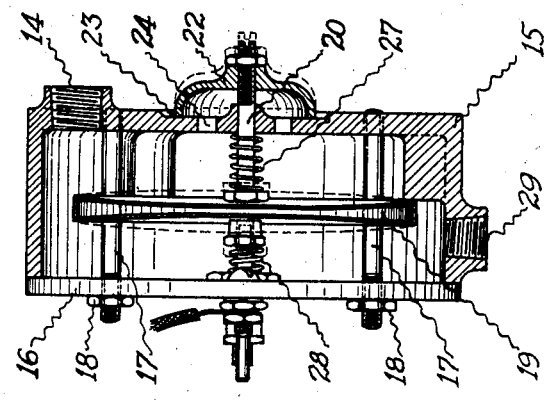
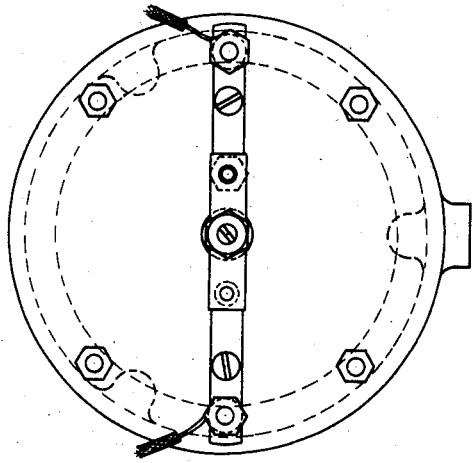
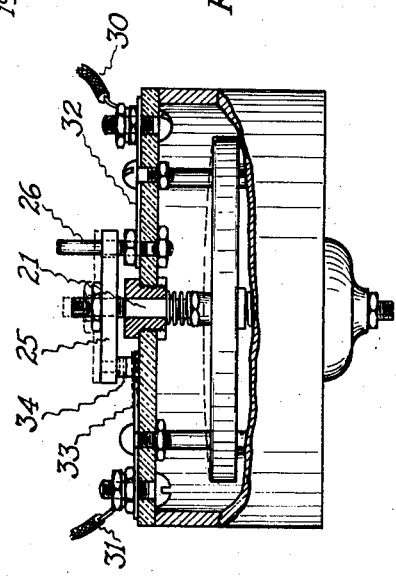

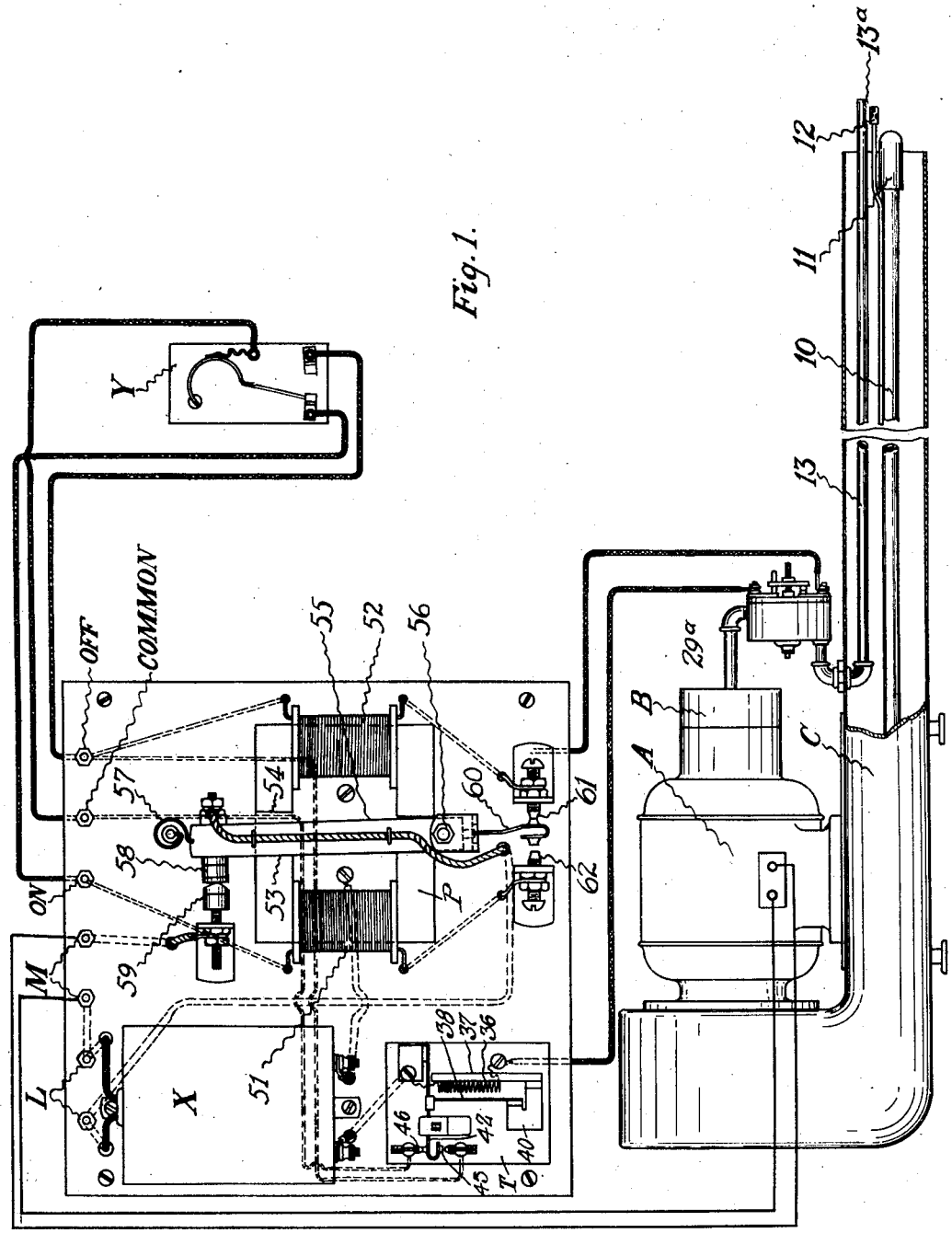

Nov. 6, 1928.
W. W. WILLIAMS
1,691,002
SAFETY CONTROL MECHANISM FOR FUEL FEEDING DEVICES
Original Filed Aug. 31, 1923    3 Sheets-Sheet 3
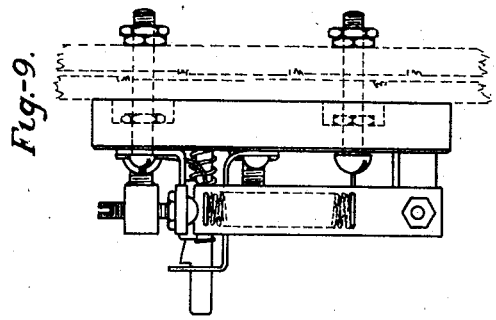
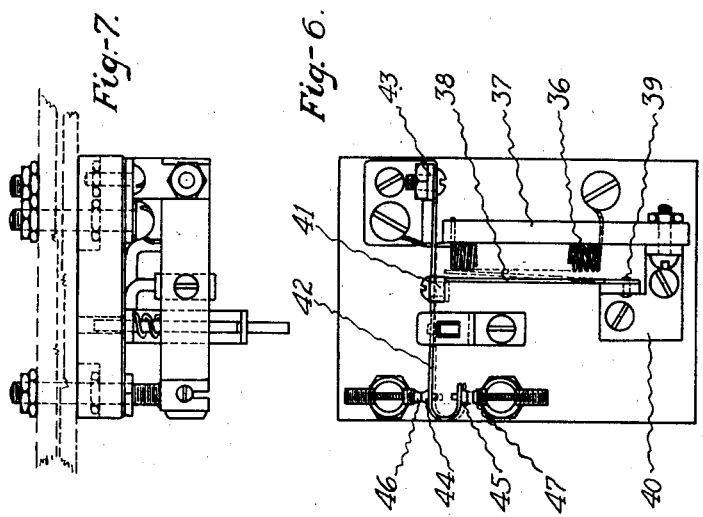
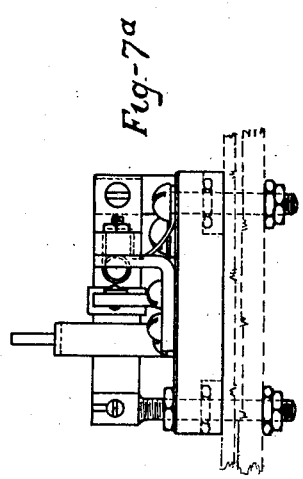
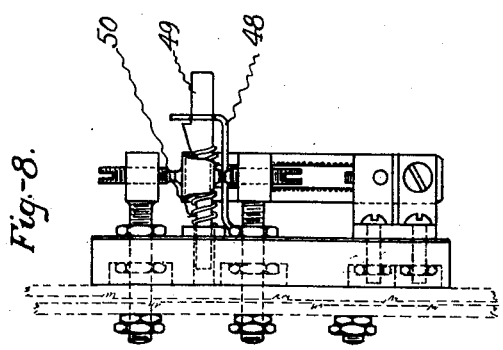

Patented Nov. 6, 1928.

REISSUED 1,691,002

UNITED STATES PATENT OFFICE.

WALTER W. WILLIAMS, OF BLOOMINGTON, ILLINOIS, ASSIGNOR TO WILLIAMS OIL-O-MATIC HEATING CORPORATION, OF BLOOMINGTON, ILLINOIS, A CORPORATION OF ILLINOIS.

SAFETY CONTROL MECHANISM FOR FUEL-FEEDING DEVICES.

Application filed August 31, 1923, Serial No. 660,314. Renewed January 20, 1926.

My invention relates to safety control mechanism in connection with liquid fuel feeding devices.

The object of my invention is in the provision of a mechanism which provides safety means for controlling the action of liquid fuel burning devices; said mechanism being responsive and controlled by the heat given off by the pilot light.

Another object of my invention is in a mechanically operating means for withdrawing the hot air generated by the pilot light to the so-called safety mechanism.

Other objects of my invention will appear in the following specification in connection with the annexed drawings in which Fig. 1 is a view showing the combination including the liquid fuel burning device and the safety mechanism, of which portions have been shown in detail.

Fig. 2 is a front elevation of a diaphragm housing in connection with the safety mechanism.

Fig. 3 is a longitudinal section view thereof.

Fig. 4 is a rear elevation of the diaphragm housing.

Fig. 5 is a plan view of the same with portions broken away for a clearer showing thereof.

Fig. 6 is a front elevation of the retarder switch included in the safety mechanism.

Figs. 7 and 7ª are upper and lower plan views of the retarder switch respectively.

Figs. 8 and 9 are right and left side elevations of the same.

Referring to the drawings, a liquid fuel burning device is shown generally at (A); the one however shown here has a pump member (B) in connection therewith; a blower housing is shown at (C), said housing projecting within any ordinary heating plant and having mounted therein the fuel tube 10 from the fuel feeding device. The tube 10 has a burner tip 11 thereon. A pilot light is shown at 12; said pilot light having connection with any ordinary gas line. The heat conveying tube 13 is mounted within the blower housing, said tube having its outer end cut away as at 13ª, this portion projecting just over the pilot light and in such manner that the heat from the light will have ready entrance to the tube 13. Tube 13 has connection with the diaphragm casing shown in Figs. 2, 3, 4 and 5 of the drawings, said tube having entrance to the diaphragm casing 14. Housing the sides and one end is a casing 15 the other end of the diaphragm housing being enclosed by the plate 16. The plate 16 is mounted in connection with the casting 15 by means of the lugs 17 and nuts 18 threaded thereon.

A diaphragm 19 is mounted within the housing members, said diaphragm being loaded with any gas that is sensitive to temperature changes with the result that variations in heat applied there against will either expand or contract it. The diaphragm 19 is acted upon by the longitudinally disposed members 20 and 21 slidable in the end portions of the diaphragm housing. The rod 20 has a safety valve member 22 mounted at its outer end, said valve in its normal position forming a seal as at 23 with the member 15. Air inlets are shown at 24. The rod 21 which has connection with the other side of the diaphragm 19 has a contact plate 25 mounted at its outer end, this plate being guided by a projecting lug 26 fixedly mounted on the plate 16.

It may be seen that both members 20 and 21 are held in spring pressed position within the diaphragm by means of the springs 27 and 28 respectively. An outlet from the diaphragm housing is shown at 29 and a tube 29ª connects it with the pump (B) of the liquid fuel feeding device with the result that action of the pump will withdraw the air heated by the pilot light through the tube 13 to the diaphragm housing.

Electrical connections are shown at 30 and 31 and by means of the plates 32 and 33 current may pass to the contact points 34, with the result that outward movement of the rod 21 caused by expansion of the diaphragm 19 will throw the contact plate 25 away from the plate 33, thus opening the circuit at the contact points 34.

Electrical connections 30 and 31 have connections as shown in Fig. 1 of the drawings with a time switch now to be described and a relay switch later to be described.

The retarder switch "T" has a vertically positioned heating coil 36 which is supported by the mounting plate 37. A spring lever 38 composed of any thermal or bi-metallic metal is attached as at 39 to a bracket member 40.

The upper end of the lever 38 rides beneath a lug 41 on a horizontally disposed contact arm 42 firmly positioned as at 43. The outer end of the contact lever has the usual contacts 44 and 45 which have possible engagement with similar contact members 46 and 47.

It may be said here that when the coil 36 is heated the lever 38 moves to the dotted line position shown in Fig. 6 of the drawings, this action being due to the difference in expansion of the two metals comprising the thermostat, and thus permits the contact arm 42 to drop, with the result that the point 45 thereof contacts with the point 47 breaking the contact between the points 44 and 46. Later when the operation of the device is described reason for this action will be brought out but now it is sufficent to say that it is necessary to raise the lever 42 in order that the spring lever 38 may again spring back under the lug 41 when it has been sufficiently cooled. Means for raising this contact arm is provided in a bracket 48 which carries the outer end of a button or lever 49 tensioned by the spring 50, thus a slightly upward movement of the button 49 will raise the lever 42 and when the member 38 is cooled it will spring back under the lug 41.

The relay switch before mentioned is shown in detail in Fig. 1 of the drawings and is composed of the following members: 51 and 52 are coils of ordinary construction mounted on a metal plate P and have the usual contact poles 53 and 54. An oscillating member 55 of metal is pivotally mounted upon a bent back depending extension of said plate as at 56 to swing between the contact poles of the two coils. A spring member 57 is attached to its upper end in such manner as to govern slightly its movement. This oscillating member has a contact lug 58 at its upper end capable of engagement with a contact member 59 which has electrical connections thereto; also, at the lower end of the member 55 is a contact arm 60 having possible contact with the points 61 and 62 depending upon the operating of the device.

A transformer having one pole connected to a terminal of the retarder switch T and the other pole connected to a terminal on the plate P is shown generally at (X) and an electrical thermostat of the ordinary construction is shown at (Y), said thermostat having the usual electrical connections thereon.

It may be said at this time relative to the co-operation of the transformer, electrical relay switch and fuel atomizing device, that two electrical circuits are utilized, one being a high voltage circuit which includes the fuel atomizing device, and a low voltage circuit produced by the use of the transformer which includes the relay switch for making and breaking the circuit to the atmoizing device, and also the formal thermostat which includes the relay switch and hence operation of the device directly from temperature conditions.

Inasmuch as the present invention is directed to a combination of a mechanical and electrical means for providing a safety mechanism controlled by the heat generated by the pilot light, it is not thought necessary to go into a detailed description of all the electrical connections between the elements which have just been described.

In Figure 1 the electrical connections are shown with the current passing through the motor and thermostat. L refers to line connections. M shows the motor connections and the other three insulated points marked respectively on, in common, and off, are connections to the thermostat (Y) of known construction.

Operation of the device is as follows:— Considering the liquid fuel device at rest and the pilot light burning, as it always is, the thermostat which controls the action of the device starts it with the result that electrical current which has been shut off is introduced to the various elements. Immediately upon the rotation of the pump (B) suction is created within the tube 13 and the air heated by the pilot light is drawn into the diaphragm housing and immediately begins to act upon the diaphragm 19. This diaphgram 19 is fashioned in such manner that at ordinary temperatures it is contracted but when heat is brought into contact therewith it expands and this is exactly what happens. The heated air from the pilot light is sucked into the housing and the diaphragm begins to expand.

Immediately, however, upon the starting of the fuel device and hence the flow of electrical current to the various elements, the coil 36 of the retarder switch begins to heat and if permitted to heat long enough acts upon the spring lever 38. However, the diaphragm 19 is timed to expand quickly with the result that an outward movement of the rod 21 results and hence the contact between the plate 25 and the member 33 is broken with the result that the flow of electrical current to the heater coil 36 in the retarder switch is broken.

It may be seen thus that under normal conditions the diaphragm will act previous to the retarder switch with the result that the retarder switch will be thrown out of operation and the device will continue to function in its normal operation. However, should the tremendous heat developed by the burning of the fuel feed from the device, become so great that the diaphragm is expanded beyond a normal amount, the safety valve 22 will open slightly, and permit the outside air to flow in through the air ports 24 and cool slightly the diaphragm.

It may well be seen that this diaphragm can not be cooled to such an extent that it will be retracted to the position it maintains when the device is out of operation, because the safety valve will close previous to that time due to the tensioning thereof.

Thus the fuel device as we have above described it, is now in operation and we will say that temperature conditions act upon the thermostat with the result that the operation of the device is stopped. Immediately upon the cessation of the device the electrical current is cut off to the various elements and with the cessation of the movement of the pump (B) air heated by the pilot light is no longer drawn into the diaphragm housing with the result that the diaphragm 19 will gradually contract to its ordinary or rather most retracted position and the contact between the plate 25 and member 33 will again be made, preparatory to the next movement or starting of the fuel device.

Should the pilot light not be lit when the thermostat again starts the device, no heated air will be drawn to the diaphragm and therefore the electrical circuit between the plate 25 and member 33 will not be broken, with the result that the heating coil 36 of the retarder switch will become so heated that it will draw the lever 38 to the dotted line position shown in Fig. 6, and hence the contact arm 42 will break contact between the points 44 and 46 and make contact with points 45 and 57, with the result that the coil 52 will be energized and the oscillating member 55 will be attracted to it, hence making the contact between points 58 and 59 whereupon the electrical circuit of the fuel device is broken and it will therefore cease its action.

However, once the retarder switch has acted, before the device may be again placed in operating condition, it will be necessary to re-light the pilot light and press the button 49 of the retarder switch upward to permit the lever 38 when sufficiently cooled to spring back beneath the lug 41 and re-set the switch.

What I claim is:—

1. In a liquid fuel burning system comprising means for atomizing a fuel mixture, a pilot light, and safety mechanism for controlling the action of said atomizer, including a retarder switch having a heating coil thereon, and a diaphragm member controlled by the heat given off by the pilot light, the action of said diaphragm controlling the action of the retarder switch.

2. In a liquid fuel burning system comprising means for atomizing a fuel mixture, a pilot light for igniting said fuel mixture, means controlled by temperature variations for controlling said atomizer, and safety means for controlling the operation of said atomizer including an electrical device thrown into operation upon an initial starting of the atomizer, said device under certain conditions being capable of stopping said atomizer and a diaphragm member directly responsive to the heat given off by the pilot light, said diaphragm under normal conditions acting thru electrical connections to throw out of operation the former electrical device and to maintain the device in an inactive state as long as the pilot light is burning.

3. The combination with a fuel burning device comprising, electrically operated means for projecting air and fuel into a zone of ignition, a combustion chamber, and a safety device including a switch member adapted to stop the burner upon failure of combustion, a heat responsive means removed from the combustion chamber connected with said switch adapted to prevent operation of the switch member when combustion occurs, and means for transmitting heat from the combustion chamber to the heat responsive means, said transmitting means being rendered operative solely by the activity of the electrically operated means.

4. The combination with a fuel burning device comprising, electrically operated means for projecting a fluid fuel into a zone of ignition, a combustion chamber, and a safety device including a thermal switch member adapted to stop the burner upon failure of combustion, a heat responsive means removed from the combustion chamber, and connected with said switch adapted to prevent operation of the switch member when combustion occurs, and means for forcing heat from the combustion chamber to the heat responsive means, said means being controlled solely through the activity of the fuel feeding means.

5. The combination with a fuel burning device, comprising, electrically operated means for projecting fluid fuel into a zone of ignition, a combustion chamber, and a safety device including a slow acting switch adapted to stop the burner upon failure of combustion, a heat responsive means removed from the combustion chamber, and connected with said switch adapted to prevent operation of the switch member when combustion occurs, and means for forcing heat from the combustion chamber to the heat responsive means, said means being controlled solely through the activity of the fuel feeding means.

6. In a liquid fuel burning system comprising a combustion chamber, means for atomizing a fuel mixture, means for igniting said fuel mixture in said combustion chamber, means for supplying air under pressure to the ignited mixture, and a safety means for controlling the action of said atomizer including a diaphragm directly responsive to temperature changes and a diaphragm mechanism, and means for withdrawing heated air from the combustion chamber about said diaphragm to the intake side of the means for supplying air under pressure.

7. In a liquid fuel burning system comprising a combustion chamber, means for atomizing a fuel mixture, means for igniting said fuel mixture in said combustion chamber and a safety means for controlling the action of said atomizer including a diaphragm casing, a diaphragm directly responsive to temperature changes mounted therein, means leading from the casing to the combustion chamber and from the casing to the atomizer, means actuated by the action of the atomizer for withdrawing heated air from the combustion chamber about said diaphragm, and means co-operating with said diaphragm upon abnormal expansion thereof admitting outside air to enter the diaphragm casing and reduce the temperature of the diaphragm.

8. In a liquid fuel burning system comprising a combustion chamber, means for atomizing a fuel mixture, means for igniting said fuel mixture in said combustion chamber, a blower for supplying air under pressure to the ignited mixture, an electrical circuit for operating said atomizer, safety mechanism including a retarder switch in said circuit adapted to be thrown into action upon the initial movement of the atomizer, mechanism including a quick acting switch in said circuit and a diaphragm directly responsive to the heat from the combustion chamber for controlling the action of said quick acting switch, and means including said atomizer for withdrawing heat from the combustion chamber about said diaphragm.

9. In a liquid fuel burning system comprising a combustion chamber, means for atomizing a fuel mixture, means for igniting said fuel mixture in said combustion chamber, a blower for supplying air under pressure to the ignited mixture, and safety means for controlling the action of said atomizer including a diaphragm mechanism mounted in a casing, and means actuated by said atomizer for withdrawing heat from the combustion chamber through said casing about said diaphragm, said diaphragm being directly responsive to the heat from the combustion chamber.

In testimony whereof, I have affixed my signature.

WALTER W. WILLIAMS.